(12) United States Patent
Weiner et al.

(10) Patent No.: US 11,136,179 B1
(45) Date of Patent: Oct. 5, 2021

(54) PILL GARAGE

(71) Applicant: Richard and Florence Weiner Revocable Living Trust, Miami Beach, FL (US)

(72) Inventors: Florence Weiner, Miami, FL (US); Richard Holtzman, Allentown, PA (US)

( * ) Notice: Subject to any disclaimer, the term of this patent is extended or adjusted under 35 U.S.C. 154(b) by 0 days.

(21) Appl. No.: 17/156,624

(22) Filed: Jan. 24, 2021

Related U.S. Application Data

(60) Provisional application No. 63/093,296, filed on Oct. 18, 2020.

(51) Int. Cl.
*B65D 83/04* (2006.01)
*A61J 1/03* (2006.01)

(52) U.S. Cl.
CPC .............. *B65D 83/04* (2013.01); *A61J 1/03* (2013.01)

(58) Field of Classification Search
CPC . B65D 83/04; A61J 1/03; A61J 1/1412; A61J 7/0076; A61J 7/0481
USPC .... 206/527, 528, 540; 215/3, 216, 217, 228, 215/307; 220/200, 254.1, 254.9, 345.1, 220/351, 354.4, 890; 221/1, 154, 306
See application file for complete search history.

(56) References Cited

U.S. PATENT DOCUMENTS

| | | | | |
|---|---|---|---|---|
| 2,075,776 A * | 3/1937 | Barnby | ............... | B65D 47/263 215/43 |
| 4,544,063 A * | 10/1985 | Neward | ............... | B65D 47/263 206/528 |
| 5,099,999 A * | 3/1992 | Balien | ................ | B65D 83/0481 206/536 |
| 5,579,933 A * | 12/1996 | Hofmann | ............. | B65D 47/283 206/536 |
| 5,947,345 A * | 9/1999 | Hofmann | ............. | B65D 50/043 222/519 |
| 8,136,687 B2 * | 3/2012 | Wu | ........................... | A61J 7/04 220/254.1 |
| 2014/0217056 A1 * | 8/2014 | Parekh | .................. | B65D 41/04 215/228 |
| 2017/0267440 A1 * | 9/2017 | Sanders | ................ | A61J 1/1412 |

* cited by examiner

*Primary Examiner* — Luan K Bui

(57) ABSTRACT

In accordance with one or more embodiments of the invention, a pill garage is presented, including an end cap portion, an inner bottle portion, an outer bottle portion, and a protrusion. The pill garage facilitates access to pills within a pill bottle engaged with a pill garage.

17 Claims, 8 Drawing Sheets

PILL GARAGE

CROSS-REFERENCE TO RELATED APPLICATIONS

This application claims the benefit of U.S. Provisional Application No. 63/093,296, filed Oct. 18, 2020. The contents of the above-identified application are incorporated by reference in their entirety as if recited in full herein.

BACKGROUND OF THE INVENTION

Field of Invention

The inventions disclosed herein generally relate to replacements for covers for pill containers, including prescription pill containers. More particularly, the inventions relate to making pill containers and their use more accessible to people with limited mobility or dexterity, often related to disabilities or age related challenges. The inventions facilitate one-handed access to pills within a pill bottle. The inventions further facilitate the display and selection of pills from a pill container, including for those with disabilities or age related challenges.

Description of Related Art

Traditional pill containers typically have two main variations of caps, regular screw-top caps and safety caps. Either can provide extraordinary challenges to people with limited mobility or dexterity, including related to disabilities or age. The act of opening a pill bottle safety cap can require great physical or dexterity-related demands.

BRIEF SUMMARY OF EMBODIMENTS OF THE INVENTION

Aspects of the inventions include a pill garage for engagement with a pill bottle, to facilitate accessing pills from the pill bottle, the pill garage comprising an end cap portion having a substantially circular shape, with an outer radius larger than an outer radius of the opening of a pill bottle, an inner bottle portion extending from the end cap portion, the inner bottle portion having a substantially circular shape, a thickness, and a length, the inner bottle portion having an outer surface having an outer radius, an outer radius of the inner bottle portion nominally smaller than an inner radius of the opening of the pill bottle, where the inner bottle portion is substantially concentric with an outer circumference of the end cap portion, an outer bottle portion extending from the end cap portion, towards a distal end of the outer bottle portion, the outer bottle portion having a substantially semicircular shape and a length, the outer bottle portion having an outer surface and an inner surface, a radius of the outer surface of the outer bottle portion being substantially the same as an outer radius of the end cap portion, a length of the outer bottle portion being substantially longer than a length of the inner bottle portion, a ridge along a substantial portion of an inner surface of the outer bottle portion, the ridge being oriented substantially perpendicular an axial length of the outer bottle portion, where an opening end of the pill container fits in-between the inner bottle portion and the outer bottle portion, where an engaged pill garage can slide, relative to the pill bottle, between a closed position on the pill bottle and a maximally open position on the pill bottle, where the ridge along an inner surface of the outer bottle portion engages with locks on the pill bottle at the maximally open position of the pill garage, where the outer bottle portion is at least partially deformable, such that the pill garage can be engaged with and disengaged with the pill bottle, and where the outer bottle portion includes a protrusion proximate the distal end of the outer bottle portion, the protrusion extending away radially from the outer surface of the outer bottle portion.

Aspects may also include where an engaged pill bottle can move between the closed position and the maximally open position relative to the pill garage, with the pill garage supporting the pill bottle on a surface by connection proximate the protrusion and proximate at least a portion of the end cap, and where the pill bottle does not contact the surface at any point between the closed position and the maximally open position. Aspects may include where the end cap portion includes at least one radial indentation. Aspects may include where the inner surface of the outer bottle portion has two distinct sections, each distinct section having a different thickness, the difference in thickness defining the ridge. Aspects may include where the outer bottle portion comprises two distinct sections, each distinct section having a different circumferential length relative to an outer portion of the end cap portion. Aspects may include where the section having a smaller circumferential length relative to the end cap portion extends approximately half way circumferentially around the end cap portion. Aspects may include wherein the outer surface of the inner bottle portion is textured for engagement with the pill bottle locks. Aspects may include wherein the outer surface of the inner bottle portion is textured for engagement with the pill bottle locks. Aspects may include wherein the protrusion is oriented substantially opposite radially to the indentation on the end cap portion.

Aspects may include wherein in the maximally open position of the pill garage relative to an engaged pill bottle, an open reservoir is provided for pills, the open reservoir being defined by a portion of an inner surface of the outer bottle portion, the opening of the engaged pill bottle, and one or more of an inner surface of the end cap portion and a surface of the inner bottle portion. Aspects may include where the pill garage is of non-unitary construction, and where at least the end cap portion and the outer bottle portion are connected to form the pill garage. Aspects may include where the end cap portion and the outer bottle portion join via a joint.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION OF EMBODIMENTS OF THE INVENTION

Figure 1:
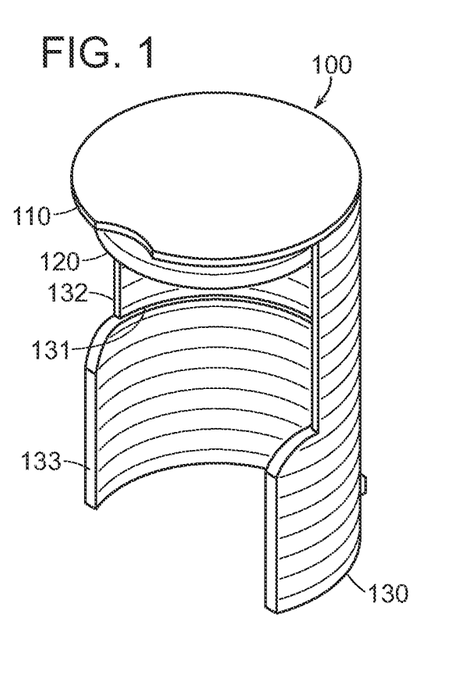
FIG. 1 illustrates an exemplary pill garage.

FIG. 1 illustrates exemplary pill garage 100, including end cap portion 110, inner bottle portion 120, outer bottle portion 130, ridge 131, thinner section 132, and thicker section 133. As illustrated in FIG. 1, an outer surface of outer bottle portion 130 may be textured, and an inner surface of outer bottle portion 130 may also be textured. Such textures may be in the form of small ridges that may provide additional grip. Other surface textures are also contemplated. Also as illustrated in FIG. 1, a portion of the outer radius of inner bottle portion 120 may be textured. Such texture may include ridges. Also as illustrated in FIG. 1, ridge 131 is defined by the border of thinner section 132 and thicker section 133. Other embodiments may include ridge 131, without thinner section 132 and thicker section 133. For example, outer bottle portion 130 may be comprised of a generally single or uniform thickness, and ridge 131 may be a primary variation from a surface of outer bottle portion 130. Also as illustrated in FIG. 1, outer bottle portion 130 comprises two distinct sections, here illustrated as thinner section 132 and thicker section 133, each distinct section having a different circumferential length relative to an outer portion of end cap portion 110. In some embodiments, the two distinct sections having different circumferential lengths relative to an outer portion of end cap portion 110 may be of substantially similar thicknesses. As illustrated in FIG. 1, the section having the smaller circumferential length relative to end cap portion 110, here illustrated as section 132, extends approximately half way circumferentially around end cap portion 110.

Figure 2:
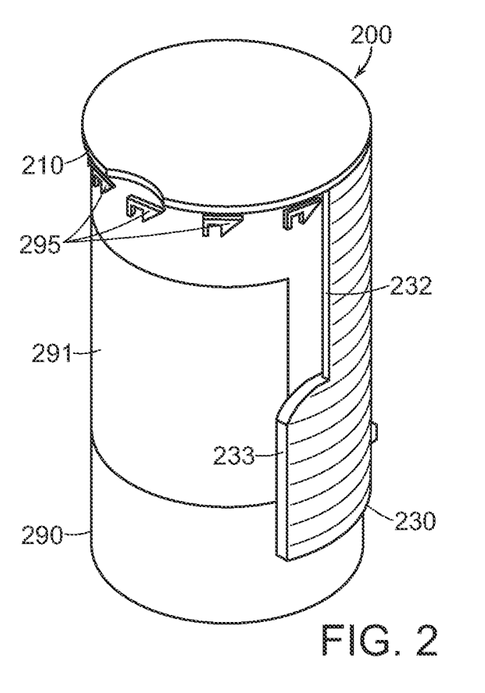
FIG. 2 illustrates an exemplary pill garage, engaged with a pill bottle, in a closed position.

FIG. 2 illustrates exemplary pill garage 200, including end cap portion 210, and outer bottle portion 230 including thinner section 232 and thicker section 233. FIG. 2 also illustrates pill bottle 290, including label 291, and locks 295. Pill bottle 290 may be, by way of nonlimiting example, a standard or nonstandard prescription pill bottle. Pill bottle locks 295 allow pill bottle 290 to engage with a traditional safety cap, not illustrated in FIG. 2. FIG. 2 illustrates pill garage 200 engaged with pill bottle 290, in a closed position. As illustrated in FIG. 2, an opening end of pill bottle 290 fits in-between the end cap portion and outer bottle portion 230.

Figure 3:
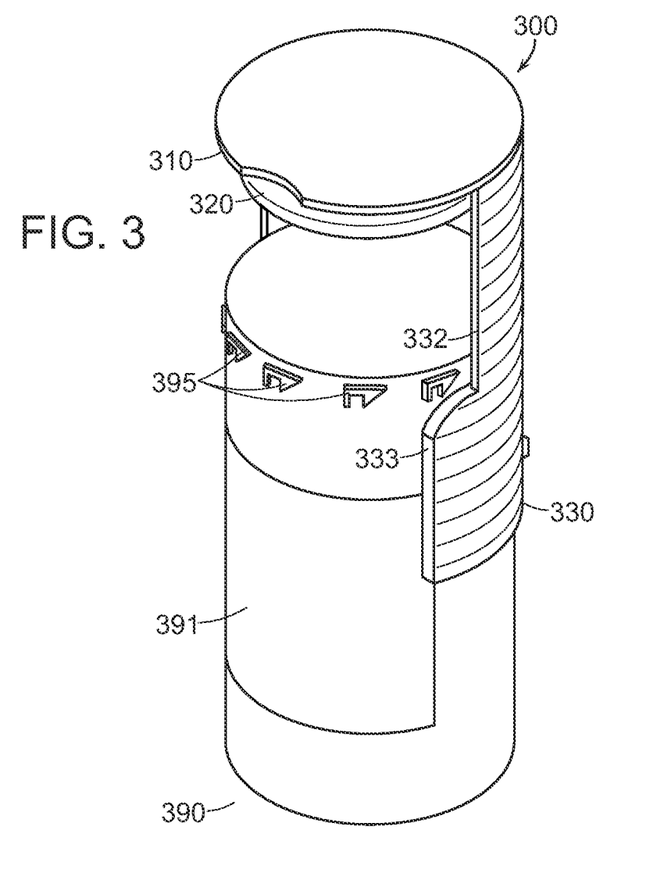
FIG. 3 illustrates an exemplary pill garage, engaged with a pill bottle, in an open position.

FIG. 3 illustrates exemplary pill garage 300, including end cap portion 310, inner bottle portion 320, and outer bottle portion 330 including thinner section 332 and thicker section 333. FIG. 3 also illustrates pill bottle 390, with label 391, and locks 395. FIG. 3 illustrates exemplary pill garage 300 engaged with pill bottle 390, in an open position.

Figure 4:
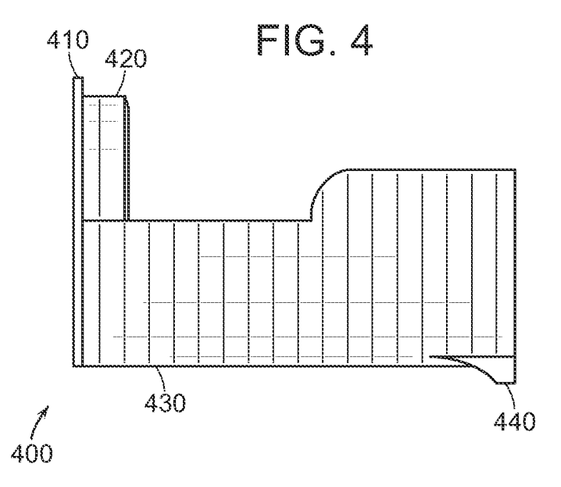
FIG. 4 illustrates a side view of an exemplary pill garage.

FIG. 4 illustrates exemplary pill garage 400 from a side view. Pill garage 400 includes end cap portion 410, inner bottle portion 420, outer bottle portion 430, and protrusion 440. Protrusion 440 is preferably located proximate the distal end of outer bottle portion 430, as illustrated in FIG. 4. Protrusion 440 extends out from an outer surface of outer bottle portion 430. Protrusion 440 may be implemented as part of outer bottle portion 430. Protrusion 440 may be implemented as one or more additional parts that may be affixed to outer bottle portion 430. Protrusion 440 may be formed from the same material as outer bottle portion 430. Protrusion 440 may be integral to outer bottle portion 430. Protrusion 440 may provide one or more regions of contact with a surface on which pill garage 400 may be placed. In a preferred embodiment, protrusion 430 may provide three distinct regions of contact with a surface on which pill garage 400 may be placed, at different times; the entire width of protrusion 440; one side of protrusion 440; or the other side of protrusion 440. Another provided region of contact with a surface is the region by the proximate end outer bottle portion 430 adjacent end cap portion 410.

Figure 5:
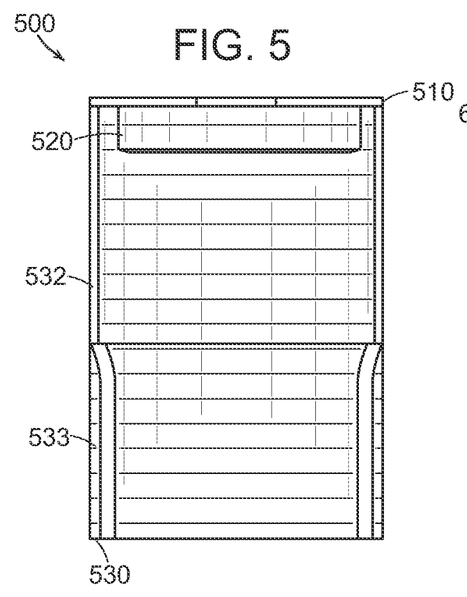
FIG. 5 illustrates a front view of an exemplary pill garage.

FIG. 5 illustrates exemplary pill garage 500 from a front view. Pill garage 500 is illustrated with end cap portion 510, inner bottle portion 520, and outer bottle portion 530. As illustrated in FIG. 5, outer bottle portion 530 is optionally shown to include thinner section 532 and thicker section 533. Also as illustrated in FIG. 5, a distal portion of outer bottle portion 530, here shown as thicker section 533, may extend circumferentially beyond the end of a proximate portion of outer bottle portion 530, here shown as thinner section 532. This can be seen from the side view of FIG. 4 as well, noting that in FIG. 4, outer bottle portion 430 may comprise a thinner section and a thicker section, but also outer bottle portion 430 may be of substantially uniform thickness, while preferably still having a ridge.

Figure 6:
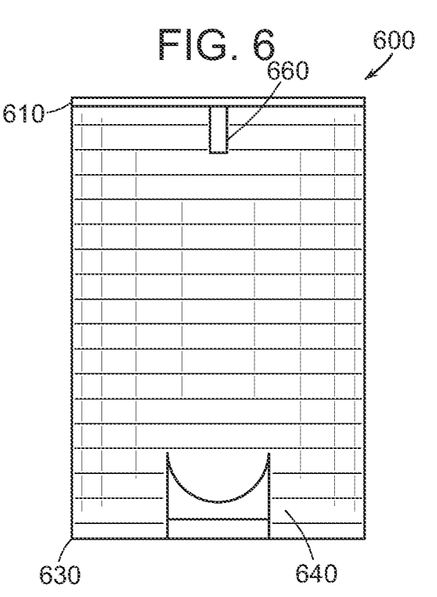
FIG. 6 illustrates a rear view of an exemplary pill garage.

FIG. 6 illustrates exemplary pill garage 600 from a rear view. Pill garage 600 is illustrated with end cap portion 610, joint 660, outer bottle portion 630, and protrusion 640. Joint 660 may be used in part to align and or connect end cap portion 610 with outer bottle portion 630. As illustrated in FIG. 6, protrusion 640 has a width of approximately one-third the outer diameter of end cap portion 610. Protrusion 640 may be wider or narrower than approximately one-third the outer diameter of end cap portion 610. Either side of protrusion 640, or the length of protrusion 610, may rest upon a surface while pill garage 600 is engaged with a pill bottle.

Figure 7:
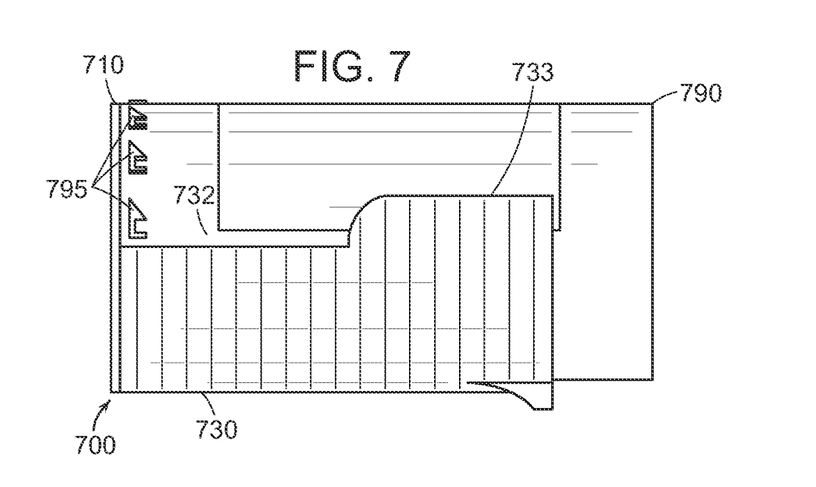
FIG. 7 illustrates a side view of an exemplary pill garage, engaged with a pill bottle, in a closed position.

FIG. 7 illustrates a side view of exemplary pill garage 700, engaged with pill bottle 790, in a closed position. Pill garage 700 is illustrated with end cap portion 710, and outer bottle portion 730. As illustrated in FIG. 7, outer bottle portion 730 optionally includes thinner section 732 and thicker section 733. Also as illustrated in FIG. 7, thicker section 733 extends beyond thinner section 732 circumferentially relative to end cap portion 710. FIG. 7 also illustrates engaged pill bottle 790, including locks 795.

Figure 8:
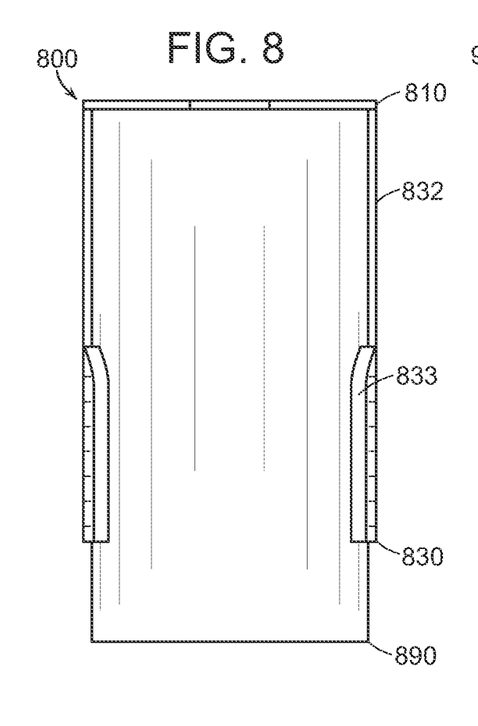
FIG. 8 illustrates a front view of an exemplary pill garage, engaged with a pill bottle, in a closed position.

FIG. 8 illustrates a front view of exemplary pill garage 800, engaged with pill bottle 890, in a closed position. Pill garage 800 is illustrated with end cap portion 810, and outer bottle portion 830. As illustrated in FIG. 8, outer bottle portion 830 optionally includes thinner section 832 and thicker section 833.

Figure 9:
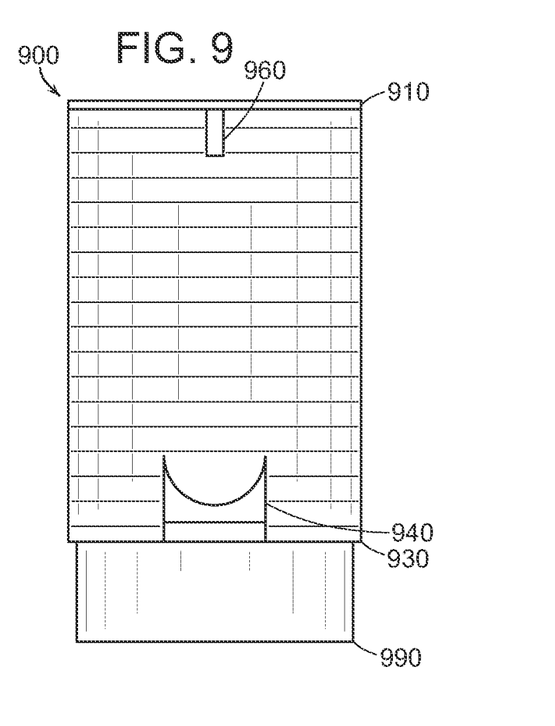
FIG. 9 illustrates a rear view of an exemplary pill garage, engaged with a pill bottle, in a closed position.

FIG. 9 illustrates a rear view of exemplary pill garage 900, engaged with pill bottle 990, in a closed position. Pill garage 900 is illustrated with end cap portion 910, outer bottle portion 930, protrusion 940, and joint 960.

Figure 10:
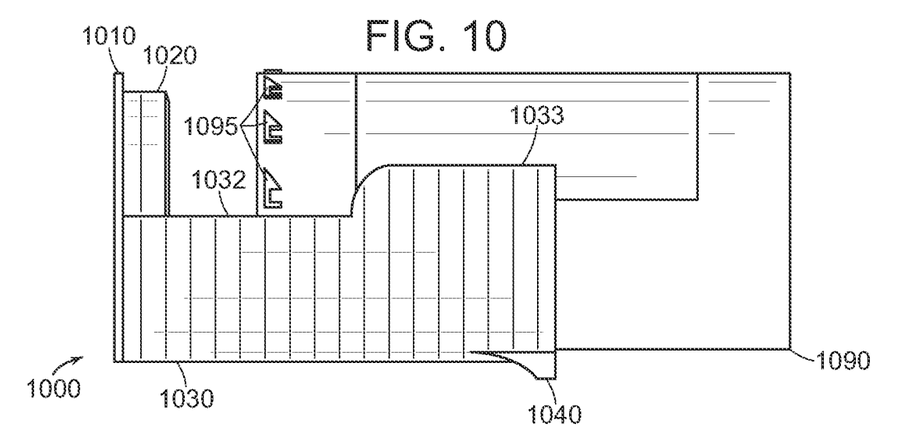
FIG. 10 illustrates a side view of an exemplary pill garage, engaged with a pill bottle, in an open position.

FIG. 10 illustrates a side view of exemplary pill garage 1000, engaged with pill bottle 1090, in an open position. Pill garage 1000 is illustrated with end cap portion 1010, inner bottle portion 1020, outer bottle portion 1030, and protrusion 1040. As illustrated in FIG. 10, outer bottle portion 1030 is shown to comprise two different portions with different circumferential lengths relative to end cap portion 1010. As illustrated in FIG. 10, smaller circumferential length portion 1032 is illustrated as extending approximately half way circumferentially around end cap portion 1010. Also as illustrated in FIG. 10, larger circumferential length portion 1033 extends circumferentially more than half way around end cap portion 1010. Also illustrated in FIG. 10 is pill bottle 1090, with locks 1095. As illustrated in FIG. 10, outer bottle portion 1030 transitions from smaller circumferential length portion 1032 to larger circumferential length portion 1033 over a short distance, with this portion of outer bottle portion 1030 providing a surface in part to facilitate closing pill garage 1000 relative to engaged pill bottle 1090.

Figure 11:
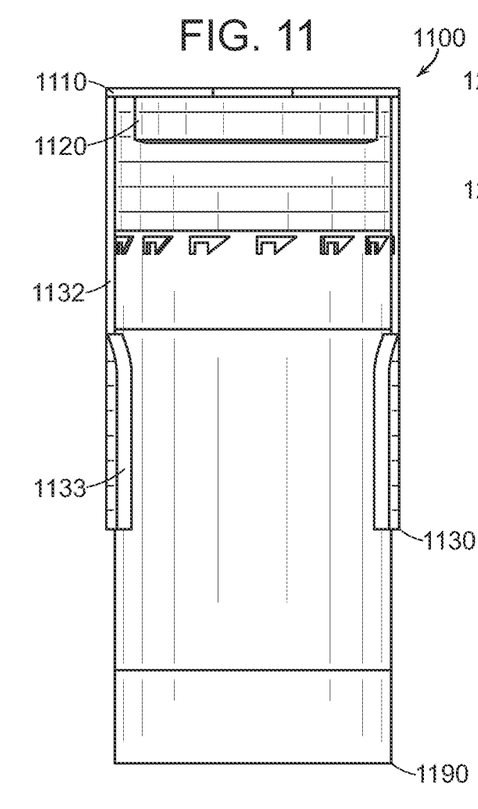
FIG. 11 illustrates a front view of an exemplary pill garage, engaged with a pill bottle, in an open position.

FIG. 11 illustrates a front view of exemplary pill garage 1100, engaged with pill bottle 1190, in an open position. Pill garage 1100 as illustrated in FIG. 11 includes end cap portion 1110, inner bottle portion 1120, and outer bottle portion 1130. As illustrated in FIG. 11, outer bottle portion 1130 is comprised of two distinct sections, smaller circumferential length portion 1132 and larger circumferential length portion 1133. As illustrated in FIG. 11, smaller circumferential length portion 1132 may be a thinner section, and larger circumferential length portion 1133 may be a thicker section, relative to one another. FIG. 11 also illustrates pill bottle 1190, engaged with pill garage 1100.

Figure 12:
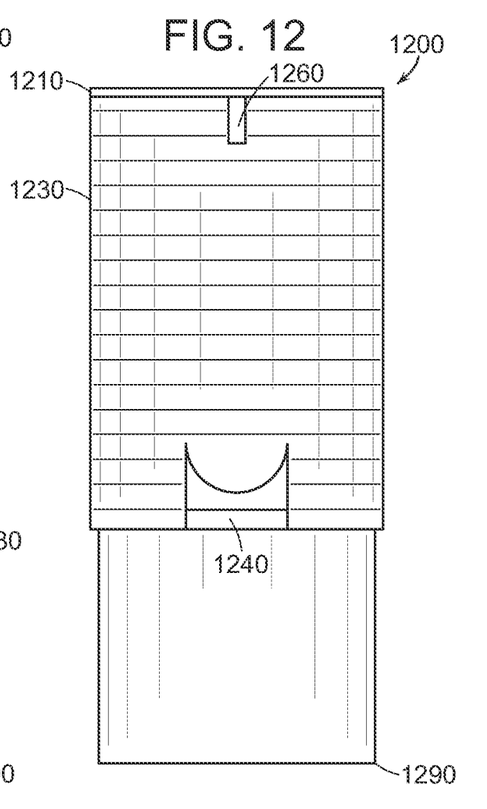
FIG. 12 illustrates a rear view of an exemplary pill garage, engaged with a pill bottle, in an open position.

FIG. 12 illustrates a rear view of exemplary pill garage 1200, engaged with pill bottle 1290, in an open position. As illustrated in FIG. 12, pill garage 1200 includes end cap portion 1210, joint 1260, outer bottle portion 1230, and protrusion 1240. Note that as illustrated in FIG. 12, protrusion 1240 optionally has a width approximately equal to one-third the outer diameter of end cap portion 1210. In other embodiments, protrusion 1240 may have a greater or a smaller width relative to the outer diameter of end cap portion 1210.

Figure 13A:
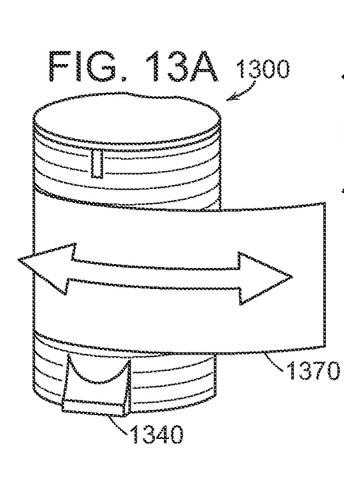
FIG. 13A illustrates an exemplary pill garage with a label.

FIG. 13A illustrates exemplary pill garage 1300, with protrusion 1340, and label 1370. Label 1370 may be attached to pill garage 1300 via adhesive or other ways. Label 1370 may contain information on pills contained in pill garage 1300 and its engaged pill bottle.

Figures 13B, 13C:
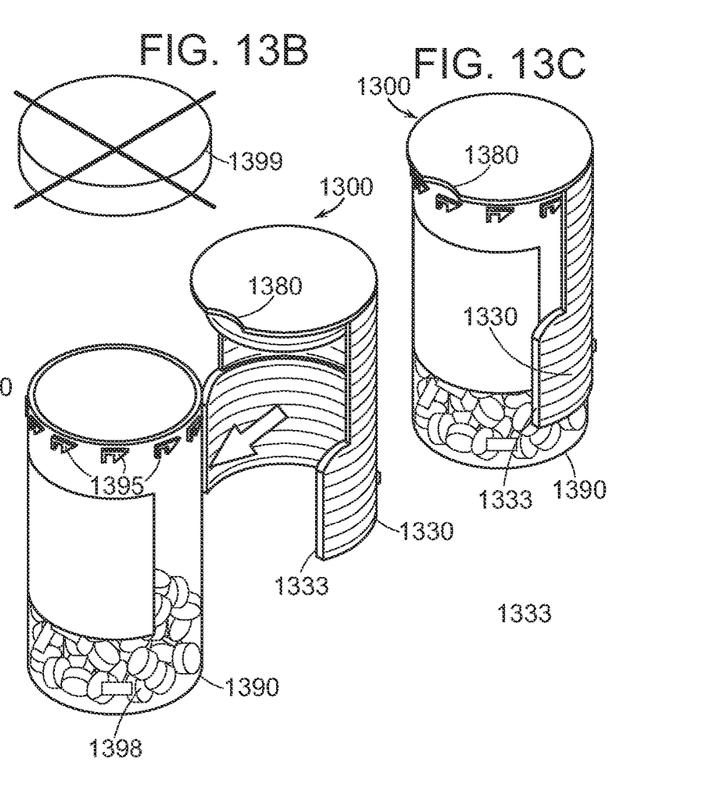
FIG. 13B illustrates a pill bottle, a pill bottle cap, and an exemplary pill garage.
FIG. 13C illustrates a perspective view of an exemplary pill garage engaged with a pill bottle.

FIG. 13B illustrates pill bottle 1390, traditional pill bottle cap 1399, and exemplary pill garage 1300. As illustrated in FIG. 13B, traditional pill bottle cap 1399 is removed from pill bottle 1390, and set aside. Pill garage 1300 is then engaged with pill bottle 1390. As illustrated in FIG. 13B, pill garage 1300 includes outer bottle portion 1330, including larger circumferential length portion 1333. Also as illustrated in FIG. 13B, pill garage 1300 includes indentation 1380 in the end cap portion. Indentation 1380 is preferably a curved indentation, and the two areas of intersection between indentation 1380 and an outer circumference of the end cap portion provides resting points for pill garage 1300, engaged with pill bottle 1390, to rest on a surface. Based on the materials of manufacture and/or assembly, larger circumferential length portion 1333 deforms when pill garage 1330 engages and disengages with pill bottle 1390. Exemplary methods of creation of a pill garage may include additive manufacturing. Materials used may include a range of plastics, advanced materials, and other state of the art components.

FIG. 13C illustrates a perspective view of exemplary pill garage 1300, engaged with pill bottle 1390. As illustrated in FIG. 13C, pill garage 1300 includes indentation 1380 on the end cap portion. Also as illustrated in FIG. 13C, pill garage 1300 includes outer bottle portion 1330. Pill bottle 1390 is illustrated in FIG. 13C with pills 1333 inside.

Figure 13D:
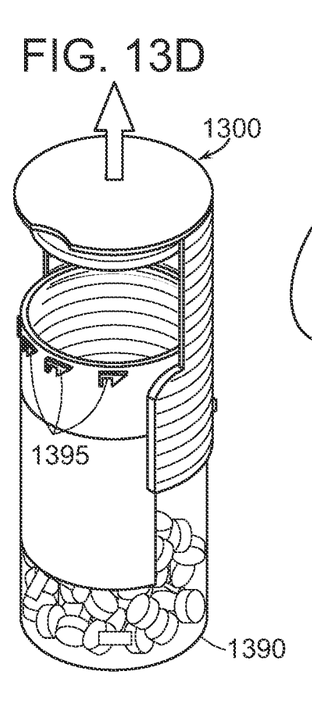
FIG. 13D illustrates an exemplary pill garage opening from an engaged pill bottle.

FIG. 13D illustrates exemplary pill garage 1300 opening relative to engaged pill bottle 1390. As illustrated in FIG. 13D, pill bottle 1390 is illustrated with locks 1395. Locks are generally fundamental to pill bottles, and the engagement of pill bottle locks with standard safety caps is typical. As illustrated in FIG. 13D, pill garage 1300, when engaged with pill bottle 1390, can slide axially relative to pill bottle 1390, between a closed position and a fully open position. At the fully open position, preferred embodiments of pill garage 1300 includes a ridge that engages with locks 1395 on pill bottle 1390, to restrain pill garage 1300 from becoming disengaged from pill bottle 1390. Thus, as pill garage 1300 is opened, its ridge gets closer to locks 1395 and eventually, at a fully opened position, locks 1395 restrain pill garage 1300 from opening further, while engaged.

Figure 13E:
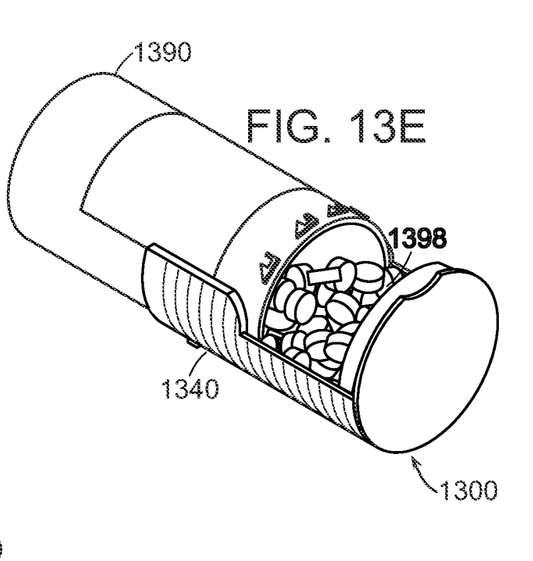
FIG. 13E illustrates an exemplary pill garage, engaged with a pill bottle, in an open position.

FIG. 13E illustrates exemplary pill garage 1300, engaged with pill bottle 1390, in an open position. Pill garage 1300 is illustrated with protrusion 1340, and illustrates how protrusion 1340 can provide a support, via points of contact with a surface, for pill garage 1300 to support engaged pill bottle 1390. As illustrated in FIG. 13E, pill garage 1300 can facilitate access to pills 1398 in pill bottle 1390. As such, pill garage 1300 provides an open reservoir for pills 1398. Such open reservoirs defined by a portion of an inner surface of the outer bottle portion, and inner surface of the end cap portion, and the opening of engaged pill bottle 1390.

Figure 13F:
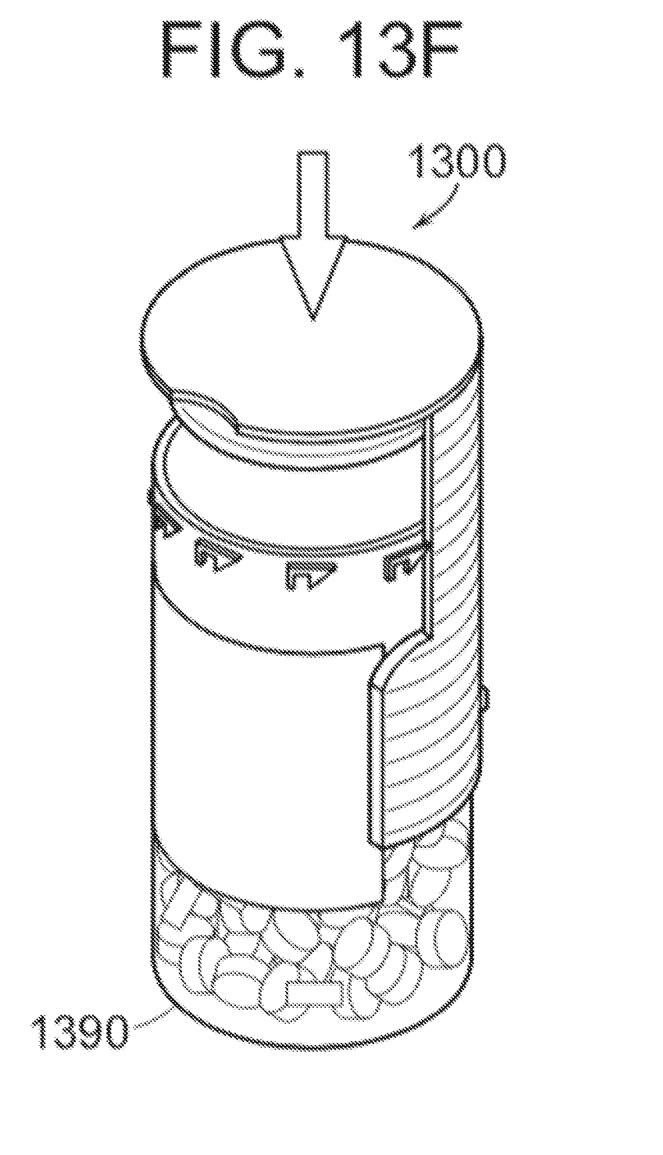
FIG. 13F illustrates an exemplary pill garage closing with an engaged pill bottle.

FIG. 13F illustrates exemplary pill garage 1300 closing with engaged pill bottle 1390. FIG. 13F illustrates the pill garage moving from a more open position relative to pill bottle 1390 to a less open position, as pill garage 1300 moves axially relative to pill bottle 1390. Thus engaged pill garage 1300 moves axially relative to pill bottle 1390 between a closed position and a maximally open position. In preferred embodiments, a ridge of pill garage 1300 engages with locks on pill bottle 1390 at a maximally open position of pill garage 1300 relative to engaged pill bottle 1390.

Bottle: Pill bottles are referred to, as are pill containers. The word 'bottle' as used herein is used in a general and inclusive manor. Thus, terms like inner bottle portion and outer bottle portion may include inner container portion and outer container portion, respectively, for example. A pill bottle may be a pill container, for example.

Maximally Open Position Terms such as 'maximally open position' are used for the relationship between a pill garage and an engaged pill bottle. In preferred embodiments, the pill garage includes an outer bottle portion that includes or from which protrude a ridge. Such a ridge makes contact with bottle locks at a maximally open position, beyond which a pill garage would disengage with an engaged pill bottle. Pill garages and pill bottle may be easily reengaged.

As will be realized, the systems and methods disclosed herein are capable of other and different embodiments and its several details may be capable of modifications in various respects, all without departing from the invention as set out in the appended claims.

Accordingly, the drawings and description are to be regarded as illustrative in nature and not in a restrictive or limiting sense with the scope of the application being indicated in the claims.

What is claimed is:

1. A pill garage for engagement with a pill bottle, to facilitate accessing pills from the pill bottle, the pill garage comprising:
    an end cap portion having a substantially circular shape, with an outer radius larger than an outer radius of the opening of a pill bottle;
    an inner bottle portion extending from the end cap portion, the inner bottle portion having a substantially circular shape, a thickness, and a length, the inner bottle portion having an outer surface having an outer radius, an outer radius of the inner bottle portion nominally smaller than an inner radius of the opening of the pill bottle, where the inner bottle portion is substantially concentric with an outer circumference of the end cap portion;
    an outer bottle portion extending from the end cap portion, towards a distal end of the outer bottle portion, the outer bottle portion having a substantially semicircular shape and a length, the outer bottle portion having an outer surface and an inner surface, a radius of the outer surface of the outer bottle portion being substantially the same as an outer radius of the end cap portion, a length of the outer bottle portion being substantially longer than a length of the inner bottle portion, a ridge along a substantial portion of an inner surface of the outer bottle portion, the ridge being oriented substantially perpendicular an axial length of the outer bottle portion;
    where an opening end of the pill bottle fits in-between the inner bottle portion and the outer bottle portion;
    where an engaged pill garage can slide, relative to the pill bottle, between a closed position on the pill bottle and a maximally open position on the pill bottle;
    where the ridge along an inner surface of the outer bottle portion engages with locks on the pill bottle at the maximally open position of the pill garage;
    where the outer bottle portion is at least partially deformable, such that the pill garage can be engaged with and disengaged with the pill bottle;
    and where the outer bottle portion includes a protrusion proximate the distal end of the outer bottle portion, the protrusion extending away radially from the outer surface of the outer bottle portion.

2. The pill garage of claim 1, where an engaged pill bottle can move between the closed position and the maximally open position relative to the pill garage, with the pill garage supporting the pill bottle on a surface by connection proximate the protrusion and proximate at least a portion of the end cap, and where the pill bottle does not contact the surface at any point between the closed position and the maximally open position.

3. The pill garage of claim 2, where the end cap portion includes at least one radial indentation.

4. The pill garage of claim 2, where the inner surface of the outer bottle portion has two distinct sections, each distinct section having a different thickness, the difference in thickness defining the ridge.

5. The pill garage of claim 2, where the outer bottle portion comprises two distinct sections, each distinct section having a different circumferential length relative to an outer portion of the end cap portion.

6. The pill garage of claim 5, where the section having a smaller circumferential length relative to the end cap portion extends approximately half way circumferentially around the end cap portion.

7. The pill garage of claim 2, wherein the outer surface of the inner bottle portion is textured for engagement with the pill bottle locks.

8. The pill garage of claim 3, wherein the protrusion is oriented substantially opposite radially to the indentation on the end cap portion.

9. The pill garage of claim 2, wherein in the maximally open position of the pill garage relative to an engaged pill bottle, an open reservoir is provided for pills, the open reservoir being defined by a portion of an inner surface of the outer bottle portion, the opening of the engaged pill bottle, and one or more of an inner surface of the end cap portion and a surface of the inner bottle portion.

10. The pill garage of claim 1, where the pill garage is of non-unitary construction, and where at least the end cap portion and the outer bottle portion are connected to form the pill garage.

11. The pill garage of claim 10, where the end cap portion and the outer bottle portion join via a joint.

12. A method of facilitating access to pills from a pill bottle, where the pill bottle is engaged with a pill garage, the method comprising:
    sliding a pill bottle, relative to a pill garage, from a closed position to a maximally opened position, the pill garage comprising an end cap portion having a substantially circular shape, with an outer radius larger than an outer radius of the opening of a pill bottle, an inner bottle portion extending from the end cap portion, the inner bottle portion having a substantially circular shape, a thickness, and a length, the inner bottle portion having an outer surface having an outer radius, an outer radius of the inner bottle portion nominally smaller than an inner radius of the opening of the pill bottle, where the inner bottle portion is substantially concentric with an outer circumference of the end cap portion, an outer bottle portion extending from the end cap portion, towards a distal end of the outer bottle portion, the outer bottle portion having a substantially semicircular shape and a length, the outer bottle portion having an outer surface and an inner surface, a radius of the outer surface of the outer bottle portion being substantially the same as an outer radius of the end cap portion, a length of the outer bottle portion being substantially longer than a length of the inner bottle portion, and a ridge along a substantial portion of an inner surface of the outer bottle portion, the ridge being oriented substantially perpendicular an axial length of the outer bottle portion;
    where an opening end of the pill bottle fits in-between the inner bottle portion and the outer bottle portion;
    where ridge of an inner surface of the outer bottle portion engages with locks on the pill bottle at the maximally open position of the pill garage;
    where the pill garage can support the engaged pill bottle, between the closed position and the maximally open position, in the air with no contact between the pill bottle and a surface on which the pill garage can rest with contact to the surface proximate a portion of the pill garage end cap and proximate a protrusion proximate the distal end of the outer bottle portion and extending away radially from the outer surface of the outer bottle portion.

13. The method claim 12, where the end cap portion includes at least one radial indentation.

14. The method of claim 12, wherein the outer surface of the inner bottle portion is textured for engagement with the pill bottle locks.

15. The method of claim 12, where the inner surface of the outer bottle portion has two distinct sections, each distinct section having a different thickness, the difference in thicknesses of the sections of the outer bottle portion defining the ridge.

16. The method of claim 12, wherein the protrusion is oriented substantially opposite radially to the indentation on the end cap portion.

17. The method of claim 12, wherein in the maximally open position of the pill garage relative to an engaged pill bottle, an open reservoir is provided for pills, the open reservoir being defined by a portion of the inner surface of the outer bottle portion, an inner surface of the end cap portion, and the opening of the engaged pill bottle.

\* \* \* \* \*